United States Patent [19]

Parulski et al.

[11] Patent Number: 5,251,021
[45] Date of Patent: Oct. 5, 1993

[54] COLOR SEQUENTIAL SCANNER INCORPORATING A SYNCHRONIZED VARIABLE EXPOSURE SHUTTER

[75] Inventors: Kenneth A. Parulski, Rochester; Gordon Geisbuesch, East Rochester; John C. Rutter, Rochester, all of N.Y.

[73] Assignee: Eastman Kodak Company, Rochester, N.Y.

[21] Appl. No.: 925,281

[22] Filed: Aug. 5, 1992

Related U.S. Application Data

[63] Continuation of Ser. No. 575,772, Aug. 31, 1990, abandoned.

[51] Int. Cl.⁵ .......................... H04N 1/46; H04N 9/07
[52] U.S. Cl. ..................................... 358/500; 358/475; 358/42
[58] Field of Search .................... 358/42, 75, 482, 483, 358/474, 213.13, 213.31, 475

[56] References Cited

U.S. PATENT DOCUMENTS

| | | | |
|---|---|---|---|
| 4,636,081 | 1/1987 | Saitoh et al. | 358/75 |
| 4,713,683 | 12/1987 | Fujimori et al. | 358/42 |
| 4,736,251 | 4/1988 | Sasaoka | 358/75 |
| 4,737,857 | 4/1988 | Rucci et al. | 358/213.13 |
| 4,831,460 | 5/1989 | Yamada | 358/213.31 |
| 4,937,663 | 6/1990 | Gerlach | 358/42 |

*Primary Examiner*—Edward L. Coles, Sr.
*Assistant Examiner*—Jill Jackson
*Attorney, Agent, or Firm*—Edward Dugas

[57] ABSTRACT

This abstract describes an apparatus for providing accurate white balance for images from a color sequential image scanner while minimizing the object illumination level. A shutter synchronized to the phase of a fluorescent light source allows for different exposure times for the red, green and blue image captures, in order to achieve proper white balance while maximizing the signal to noise ratio. By synchronizing the shutter with the AC voltage supplied to the illumination source, light level variations from one image capture to another are minimized.

5 Claims, 6 Drawing Sheets

COLOR SEQUENTIAL SCANNER INCORPORATING A SYNCHRONIZED VARIABLE EXPOSURE SHUTTER

This is a continuation of Ser. No. 575,772, filed Aug. 31, 1990, now abandoned.

TECHNICAL FIELD OF THE INVENTION

The present invention relates to optical systems for transforming a fixed color image to an electrically storable color image and more particularly to such a system incorporating an illuminant synchronized variable exposure shutter.

BACKGROUND OF THE INVENTION

In many applications, it is desirable to convert fixed color images, for example photographic negatives or prints, into electrically storable images. One method for accomplishing this is to use a monochrome image sensor and three color filters, which are placed into the light path one at a time, to obtain red, green, and blue (RGB) color separation images which can be combined to form a single color image. A typical system works by illuminating the fixed image and focusing the image through a lens and an RGB color filter wheel onto an image sensor. One example of such a system is described in U.S. Pat. No. 2,478,598 entitled, "Variable Color Filter Assembly for Television Transmitting Systems" by Frank J. Somers. It is desirable in such systems that the video signals representing the red, green and blue component colors produced by the system be equal, for white or grey portions of the color image. However, the light transmitting efficiency of the filters and the spectral response of the image sensor are typically different for red, green, and blue. U.S. Pat. No. 2,478,598 teaches a method for compensating for these differences by changing the relative sizes of the rotating red, green, and blue filters, and thus the relative sensor exposure times for the red, green, and blue separations. This provides more uniform signal levels for the red, green, and blue separations from neutral image objects, otherwise referred to as providing better "white balance". Because the shutters for the red, green, and blue filters described in that patent are affixed to the rotating filter wheel which spins at a constant velocity, only a limited range of exposure times can be obtained.

A second patent of interest for its teachings is U.S. Pat. No. 4,713,683, entitled "Illuminating and Synchronizing Device for Color Imaging Equipment" by Fujimori et al. The device of that patent utilizes a color filter wheel and an illuminating light source having an intensity level which varies when the different color filters are positioned in front of the image sensor. The color filters have different sizes, chosen according to the sensitivity of the image sensor to the particular color of the filter.

When converting color negative film images into electrical signals using a charge coupled device (CCD) image sensor with a full frame architecture, the differences between the red, green, and blue exposure times required to obtain proper white balance are especially significant. This is because normal color negative films have a yellow mask which absorbs most of the blue light, and because full frame image sensors have a significantly reduced response to blue light, relative to red and green light, due to the spectrally selective absorption of the polysilicon layer which overlays the sensor's photosites. Furthermore, the light sources typically used in such systems contain tungsten bulbs, which provide very little energy in the blue spectral region, compared to the energy they emit in the red and green regions. Fluorescent light sources provide significantly more blue energy, but unlike tungsten lamps, the light output of fluorescent bulbs fluctuates significantly in response to the phase of the AC line voltage. The aforementioned causes undesirable variations in the illumination level of the sensor. What is needed is a way to provide a light source with a high content of blue spectral energy, and a means to provide the needed range of exposure times for red, green, and blue to obtain proper white balance, while also providing consistent sensor exposures which do not change from one image capture to the next.

SUMMARY OF THE INVENTION

The apparatus of the present invention provides accurate white balance for images from a color sequential image converting system while minimizing the object illumination level by using a shutter separate from the color filter wheel, in order to provide a wide range of exposure times for the red, green, and blue separations. The apparatus also includes a fluorescent light source which provides adequate power in the blue spectral region and a circuit for synchronizing the shutter opening time to the frequency of the light source in order to prevent undesirable variations in the illumination level.

From the foregoing it can be seen that it is a primary object of the present invention to provide an improved system for converting color print images into electrically storable images.

It is another object of the present invention to provide color images with proper white balance.

Another object of the present invention is the provision of a three filter color wheel and a separately controllable shutter to provide color separation images.

Yet another object of the present invention is the provision of a system wherein the exposure times and the shutter operation are synchronized to the frequency of an illumination source.

These and other objects of the present invention will become more apparent when taken in conjunction with the following description and drawings wherein like characters indicate like parts and which drawings form a part of the present description.

DESCRIPTION OF THE PREFERRED EMBODIMENT

Figure 1:
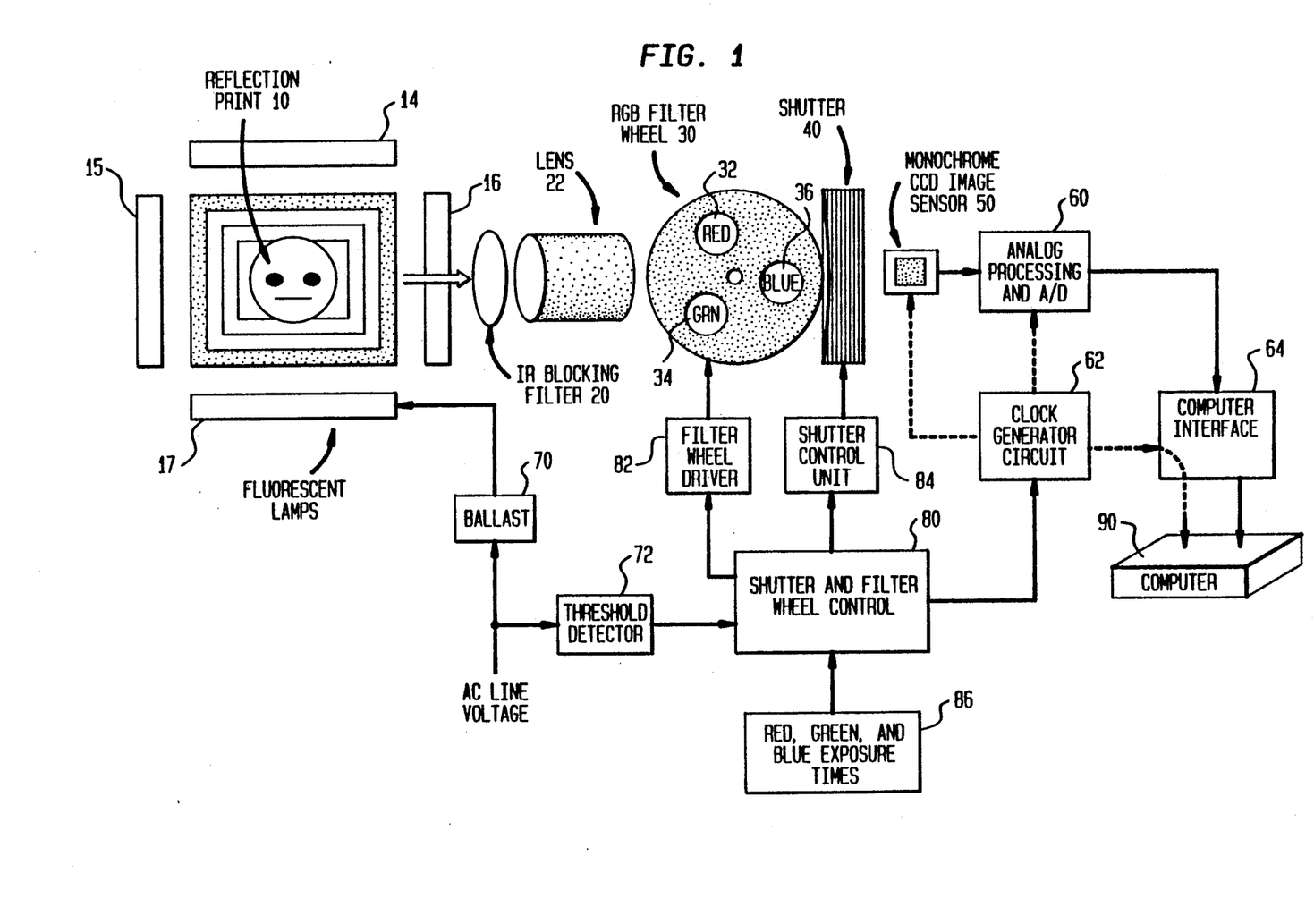
FIG. 1 is a block diagram illustrating one preferred embodiment of the invention.

FIG. 1 is a block diagram of one preferred system embodiment of the invention. In this preferred system a photographic reflection print 10 is positioned to be illuminated by four fluorescent lamps 14, 15, 16, and 17. The lamps are preferably model F6T5/D lamps available from Philips Lighting Company, Syracuse, N.Y., which lamps are powered by a 115 volt 60 cycle line voltage via a ballast circuit 70. The ballast is preferably of the type bearing Catalog Number F8 and manufactured by the Keystone Transformer Company. The image on the photographic reflection print 10 is focused by a lens 22, preferably a Nikon MicroNikkor 55 mm lens manufactured by Nikon, Inc. onto a monochrome CCD image sensor 50, which is preferably a 1024×1532 active element, full frame, image sensor of the type bearing Part Number KAF-1600 and manufactured by Eastman Kodak Company, Rochester, N.Y. An RGB filter wheel 30, incorporating a Red filter 32, a Green filter 34, and a Blue filter 36 is positioned in the optical path between the lens 22 and the image sensor 50. The filters are preferably of the type called Colorband TM dichroic color separation filters which are manufactured by OCLI, Santa Rosa, Calif. An electrically driven mechanical shutter 40, is also situated between the lens 22 and the CCD image sensor 50. The shutter 40 is preferably a Uniblitz TM Model 23X2A2S5H that is controlled by a shutter control unit 84, preferably a model 100-2B, both of which are manufactured by Vincent Associates, Rochester, N.Y. An infrared blocking filter 20, preferably a Model BG-40 manufactured by Schott Glass Technologies, Inc., Durya, Pa., is also inserted in the optical path to block long wavelength light from degrading the images.

The output of the CCD image sensor 50 is connected to a Analog processing and A/D block 60, which performs the normal amplification, correlated double sampling, and A/D functions well known to those familiar with the art of CCD image sensors. The digitized image outputted from block 60 is input to a computer 90, which can be, for example, a model 3/110 workstation manufactured by Sun Microsystems, Mountain View, Calif., and equipped with an interface card 64, preferably a General Purpose Video Framestore Model 9100 card manufactured by the Eastman Kodak Company, Rochester, N.Y.

The CCD image sensor 50 is controlled by a Clock Generator Circuit 62 which utilizes a programmable clock generator integrated circuit, Part Number PCG, manufactured by Eastman Kodak Company, Rochester, N.Y. In particular, the sensor integration period which is provided by the Clock Generator Circuit 62, to control the CCD image sensor 50, is synchronized with a pulse supplied by a Shutter and Filter Wheel control block 80. Block 80 is in turn synchronized to an alternating current (AC) line voltage via a Threshold Detector 72 (illustrated in detail in FIG. 5). The Shutter and Filter Wheel Control Block 80 (illustrated in detail in FIG. 5), also controls the Filter Wheel Driver Block 82 (illustrated in detail in FIG. 5). Digital values, indicating the desired red, green, and blue exposure times, are provided to the Shutter and Filter Wheel Control Block 80 by the RGB Exposure Times Block 86 (illustrated in detail in FIGS. 5A, 5B).

Figure 2:
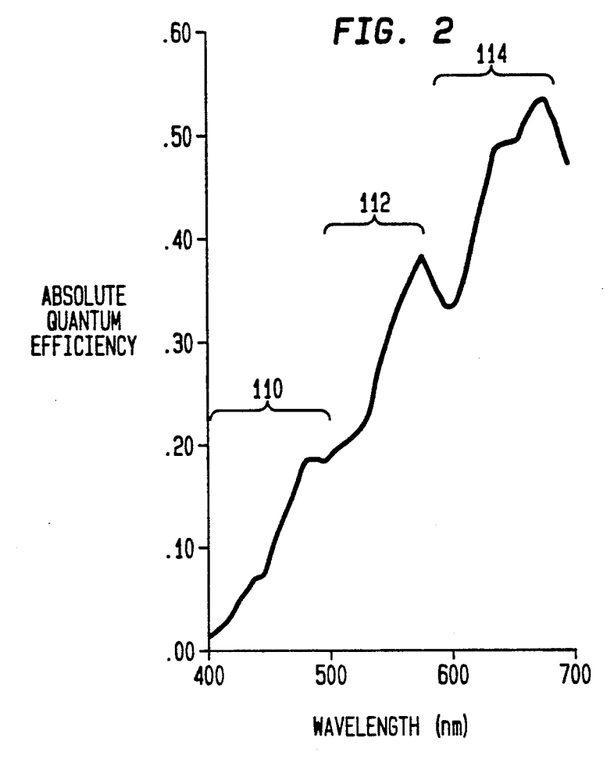
FIG. 2 is a graph of the spectral response of the image sensor used in the system of FIG. 1.

Turning now to FIG. 2, there is shown in graphical form the absolute quantum efficiency of the CCD image sensor 50 of FIG. 1. As can be easily seen from the figure, the quantum efficiency of the CCD in the blue spectral region 110, that is between the wavelengths of 400 to 500 nanometers, is significantly lower that the quantum efficiency for the green region 112, between 500 and 600 nanometers, and even lower still compared to quantum efficiency in the red region 114, between 600 and 700 nanometers. This presents a problem in obtained proper white balance, since either the red and green light must be significantly attenuated before reaching the sensor, or a means of providing significantly longer exposure times for the blue color separation must be provided.

Figure 3:
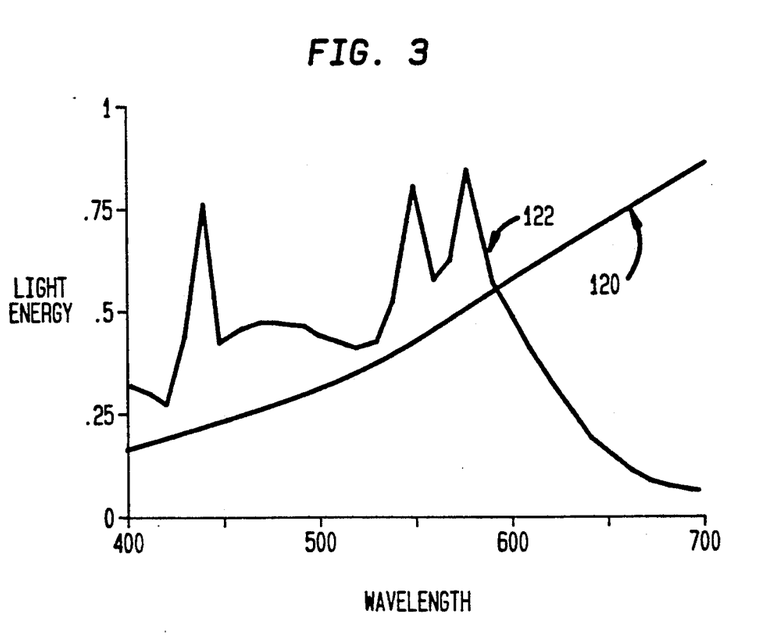
FIG. 3 is a graph of the spectral energy output of a tungsten and a fluorescent lamp.

Turning now to FIG. 3, there is shown a curve 120 representing the typical relative emission spectrum of the light from a tungsten lamp, similar to those used in prior art systems for converting fixed images into electrically storable images. As can be seen, the energy emitted in the blue spectral region is significantly lower than in the green region, while the red energy is much higher that the green energy. The use of a tungsten light source in combination with a sensor with an absolute quantum efficiency similar to that shown in FIG. 2 would present a serious problem with obtaining proper white balance, since the exposure time of the blue separation would need to be more than a factor of 10 greater than for the red. This problem would be even more severe if the system of FIG. 1 were scanning negative photographic film, since the transmittance of such a film in the blue spectral region is significantly less than in the red spectral region.

Figure 4:
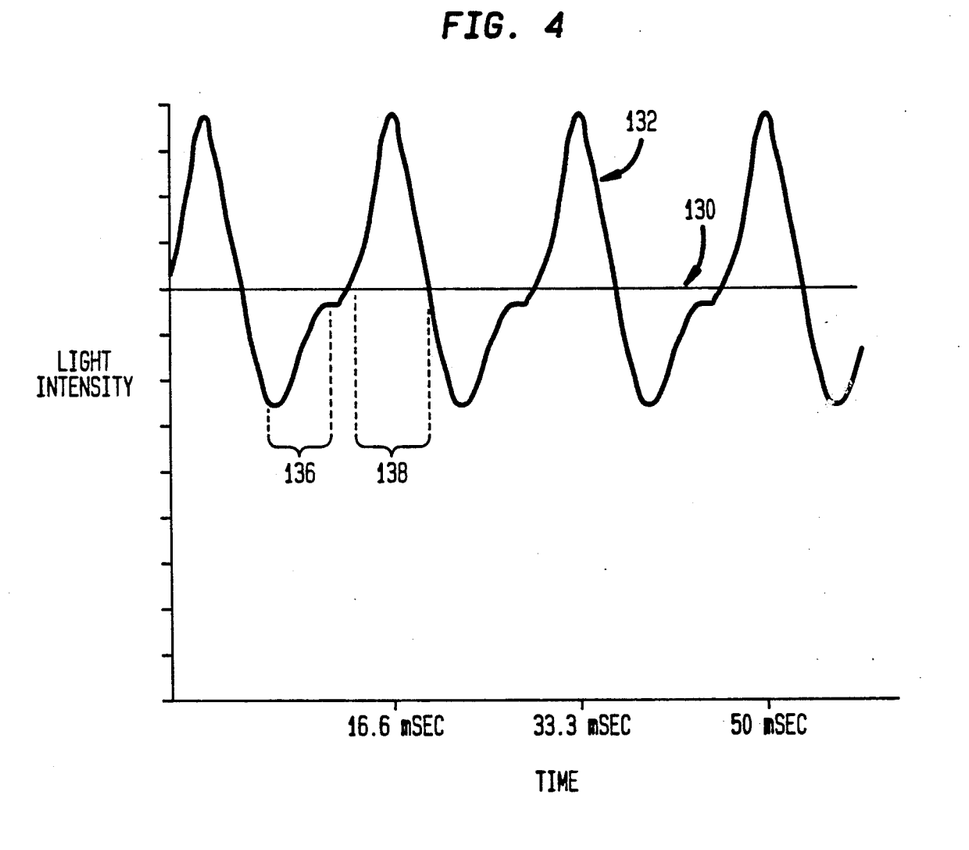
FIG. 4 is a graph of the light output for typical tungsten and fluorescent lamps.

A light source with more blue energy is therefore desirable. FIG. 3 also shows a curve 122 depicting the emission spectrum of the fluorescent light source used in the system of FIG. 1. As can be seen from the figure, there is significantly less energy in the red spectral region, which is desirable because it helps compensate the sensor quantum efficiency curve of FIG. 2. Unfortunately, fluorescent light sources are difficult to utilize in a system for transforming a fixed image to an electrically storable image, since they do not have a temporally constant light output. Rather, their light output varies with time, or "flickers", as shown by curve 132 in FIG. 4. This creates a problem in that if the sensor exposure occurs during time period 136, the sensor will receive much less light than if the sensor exposure occurs during time period 138, even though the two exposure times are equal. Tungsten lamps, by comparison, have a constant light output as a function of time, as shown by a curve 130 in FIG. 4.

In order to solve the problems described, the inventors of the present invention have designed the apparatus shown in FIG. 1 in such a manner as to eliminate the problems associated with using a flickering fluorescent illumination source while also providing for a wide range of sensor exposure times for the red, green, and blue separations by controlling a shutter separate from the filter wheel so that it always opens at a time synchronized to the phase of the flickering light output of the illumination source.

Since the inventors have recognized that the flickering light output of the fluorescent source is synchronized to the AC line voltage which powers the source, the AC line voltage is used as the phase reference to which the shutter is synchronized.

Figures 5, 5A:
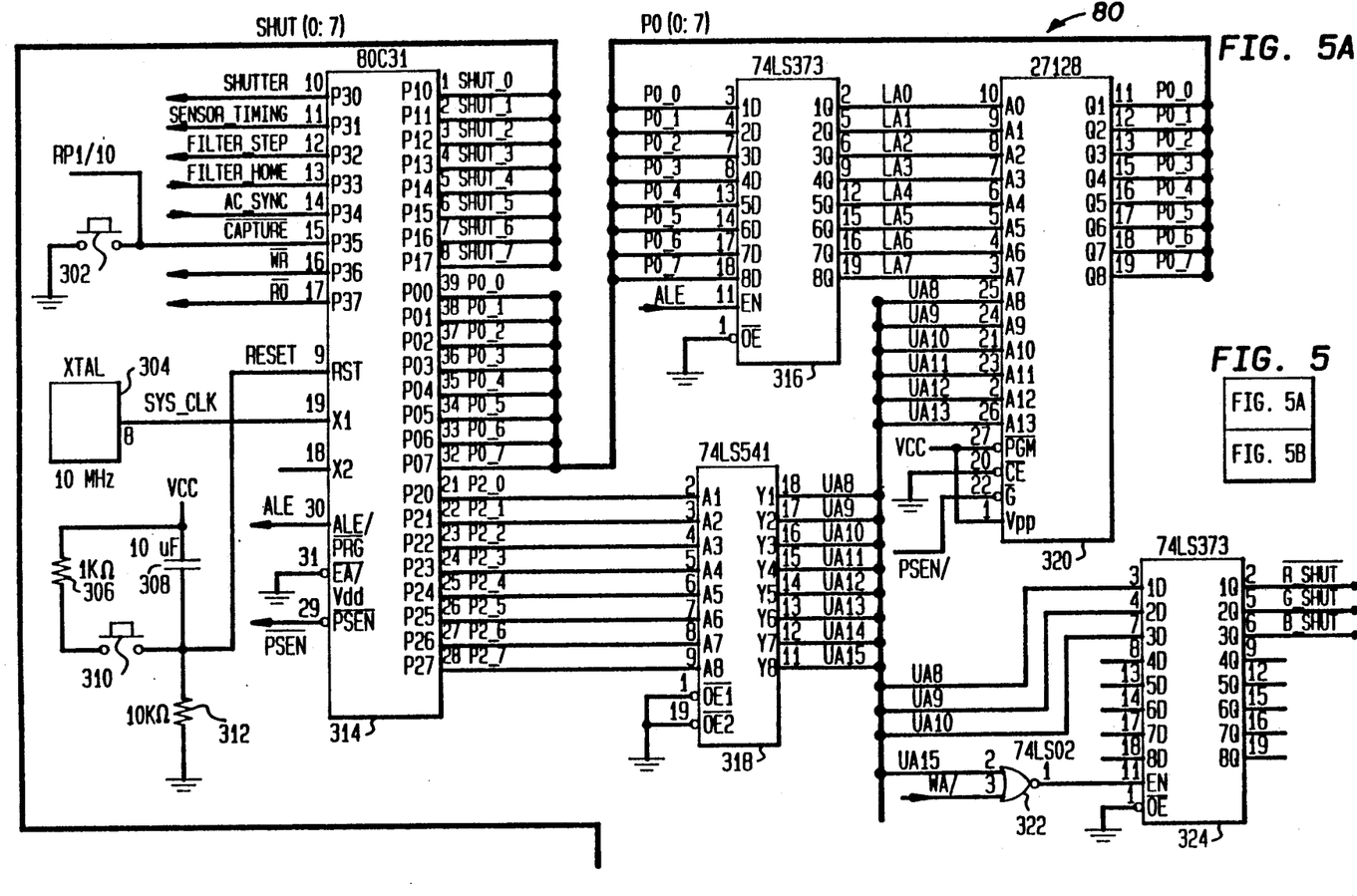
FIGS. 5, 5A, 5B are electrical schematic diagrams illustrating one preferred embodiment of portions of the control circuitry of FIG. 1.
Figure 5B:
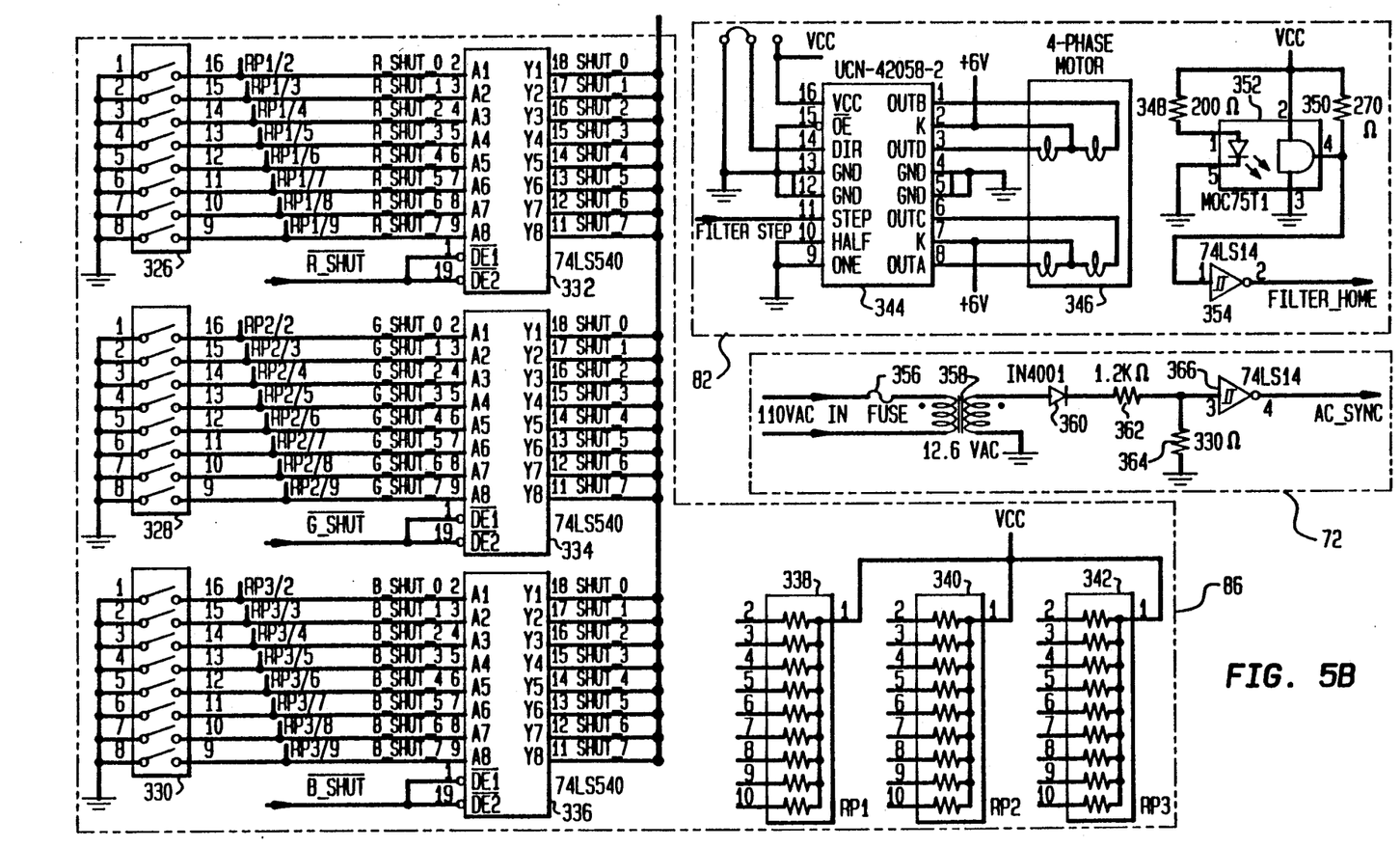

FIGS 5A, 5B are electrical schematic diagrams of the threshold detector circuit 72, the shutter and filter wheel control circuit 80, the filter wheel driver 82, and the red, green, and blue exposure times control 86, all of FIG. 1.

The threshold detector circuit 72 functions as follows. The line voltage is converted from 110 volts AC to 12.6 volts AC in transformer 358, rectified by diode 360, attenuated by the voltage divider formed by resistors 362 and 364, and converted to a digital signal, AC_SYNC, by a Schmitt-Trigger inverter 366. The digital signal from inverter 366 is connected to the Shutter and Filter Wheel Control Circuit 80 of FIG. 5.

The Shutter and Filter Wheel Control Circuit 80 of FIG. 5A functions as follows. A microprocessor 314, which is Part Number 80C31 manufactured by Intel Corp. is used to control the shutter and filter wheels, and to synchronize the CCD imager readout via the SENSOR_TIMING signal, which is connected to the clock generator circuit 62 of FIG. 5A. The microprocessor 314 is clocked by a crystal 304 at a 10 MHz clock frequency. A pushbutton switch 310, in conjunction with resistors 306 and 312 and capacitor 308, generates a reset pulse for the microprocessor 314. Another pushbutton switch 302 is used to start the sequence of events needed to capture an image. An Octal D-Type Latch 316 and Octal Tri-state Buffer 318 provide the addresses to an EPROM 320, which stores the microprocessor program. The C language code for this program is listed in the attached appendix.

The Octal D-type latch 324 and a nor gate 322 allow for memory mapping of the output lines ^R_SHUT, ^G_SHUT, and ^B_SHUT. These lines along with the input lines SHUT(0:7) to microprocessor 314 give the ability to read the values from the RGB Exposure Time Circuit 86 of FIG. 5B.

The microprocessor 314 signals the shutter control unit 84 to open and close via the SHUTTER signal line. It also controls the red, green, and blue filter wheel position via the FILTER_STEP output line and the FILTER_HOME input line, which feed the Filter Wheel Driver block 82 of FIG. 5B.

The Filter Wheel Driver block 82 of FIG. 5B functions as follows. A motor controller 344 advances a 4-phase stepper motor (filter wheel drive motor) 346 by one step when the FILTER_STEP line from the microprocessor 314 is set high. The filter wheel drive motor 346 may be mechanically linked to the RGB filter wheel 30 via a belt drive (not shown). The position of the filter wheel is sensed by an LED emitter and receiver 352, which connects to a Schmitt Trigger inverter 354. The FILTER_HOME output of inverter 354 is connected to the microprocessor 314. The digital value of the signal FILTER_HOME is 0 unless the filter wheel is positioned such that a small hole aligned with each of the three filter positions is directly between the LED emitter and receiver 352. The red filter position has a second hole near the position hole to denote this position as the home filter position. The controlling software determines if two consecutive holes are close enough to be the home position.

The RGB exposure circuit 86 of FIG. 5B functions as follows. The red exposure time is set via switch 326, which connects to an Octal Tri-state buffer 332. Likewise, the green exposure values are set via switch 328, which connects to an Octal Tri-state buffer 334, and the blue exposure values are set via switch 330, which connects to an Octal Tri-state buffer 336. The Tri-state control inputs to buffers 332, 334, and 336 are controlled by the Shutter Wheel and Filter Control Circuit 80 of FIG. 5A via lines ^R_SHUT, ^G_SHUT, and ^B_SHUT, so that the setting of the red, green and blue switches can be read, one at a time, by the microprocessor 314 via input lines SHUT (0:7). Note that although FIG. 5 shows that the RGB shutter times are based on the setting of manual switches, they could alternately be set to values received from the computer 90 which receives the digitized images.

Figure 6:
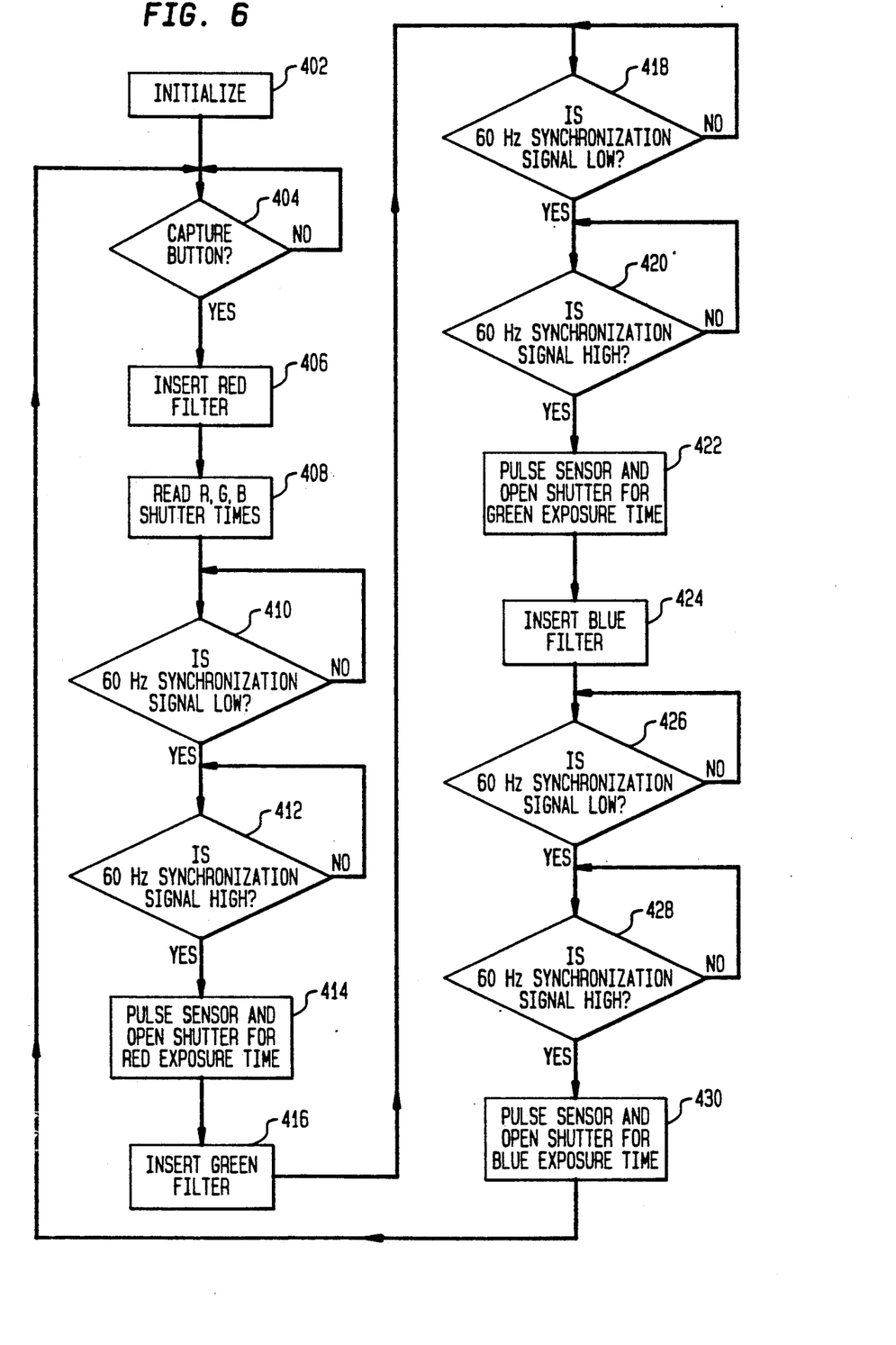
FIG. 6 is a flowchart of one preferred embodiment of the software control of the system of FIG. 1.

The sequence of operation required to capture a red, green, and blue image can now be explained. FIG. 6 is a flowchart of the program used in the control of the scanner. At 402, the variables and the I/O ports are first initialized to their starting values. The software next waits at 404 for the capture button 302 of FIG. 5 to be pressed, indicating the start of a capture. In 406, the filter wheel driver 82 of FIG. 1 positions the red filter in the optical path. The red, green, and blue shutter times are sequentially read in step 408 from switches 602, 622, and 642 of FIG. 5. In order to synchronize the shutter and sensor with the illumination system, the AC_SYNC signal of FIG. 5 is continuously read until the rising edge of the signal is detected, steps 410 and 412. At that point, 414, the proper signals are sent to both the clock generator circuit 62 and the shutter control unit 84 to capture the red image information. After the first image is captured, the red filter is replaced by the green filter in step 416 and the next rising edge of AC_SYNC signal is detected in 418 and 420. In the same manner as above for the red, the proper signals are sent to both the clock generator circuit 62 and the shutter control unit 84 to capture the green information, step 422. The same sequence of events takes place for the blue image in steps 424 through 430, after which control transfers back to step 404, awaiting another capture.

While there has been shown what is considered to be the preferred embodiment of the invention, it will be manifest that many changes and modifications may be made therein without departing from the essential spirit of the invention. It is intended, therefore, in the annexed claims, to cover all such changes and modifications as may fall within the true scope of the invention.

---

APPENDIX A

```
/* EASTMAN KODAK COMPANY, All Rights Reserved, For Internal Use Only. */
#include <stdio,h>            /* required header for printf, putchar */
#include <io51,h>             /* required header for output, bit_set, etc */
/* Following lines define signal names as on schematic. */
#define SHUTTER          P3_0_bit    /* output, shutter control signal */
#define SENSOR_TIMING    P3_1_bit    /* output, control for sensor board */
#define FILTER_STEP      P3_2_bit    /* output, filter wheel pulse train */
#define FILTER_HOME      P3_3_bit    /* input, filter home position sensor */
#define AC_SYNC          P3_4_bit    /* input, 60 Hz sync signal */
#define CAPTURE          P3_5_bit    /* input, capture pushbutton switch */
#define SHUT_0           P1_0_bit    /* input, shutter time bit 0 */
#define SHUT_0           P1_1_bit    /* input, shutter time bit 1 */
#define SHUT_0           P1_2_bit    /* input, shutter time bit 2 */
#define SHUT_0           P1_3_bit    /* input, shutter time bit 3 */
#define SHUT_0           P1_4_bit    /* input, shutter time bit 4 */
#define SHUT_0           P1_5_bit    /* input, shutter time bit 5 */
```

-continued

APPENDIX A

```
#define SHUT_0            P1_6_bit      /* input, shutter time bit 6 */
#define SHUT_0            P1_7_bit      /* input, shutter time bit 7 */
/* Motor control definitions */
#define F_PERIOD    18                  /* filter wheel timing count */
#define F_HOME      100                 /* filter wheel home slot distance*/
/* Global Variables */
int i,j,k,l,m;                          /* global counter variables */
int r_time,g_time,b_time;               /* red, green, blue shutter time variables */
int b_period;                           /* misc global variables */
/* ------------------------------------------------- */
void initialize()                       /* Initialize the 4 ports to their power-up state.*/
{
output(P0,0xFF);
output(P1,0xFF);
output(P2,0xFF);                        /* 0xFF means hex number FF */
output(P3,0xFF);
clear_bit(SHUTTER);
set_bit(SENSOR_TIMING);
select(0x5F00);                         /* don't select any color */
}
/* ------------------------------------------------- */
int wait(time)                          /* Wait function utilizing "for" loops */
int time                                /* such that "wait(1);" means wait */
{                                       /* 10ms with a 10 MHz system clock. */
for (j-1; k-time; j++)
   ;
     {
     for (k -1; k<=0x4F; k++)
     }
return(time);                           /* Returned parameter is not used. */
}
/* ------------------------------------------------- */
void advance_filter()
{
b_period = F_PERIOD;
while(read_bit(FILTER_HOME))            /* wait for filter wheel slot to clear sensor*/
   {
   set_bit(FILTER_STEP);                /* pulse filter motor high */
   for (j=1; j<=b_period; j++)
      ;
   clear_bit(FILTER_STEP);              /* pulse motor low */
   for (j=1; j<=b_period; j++)
      ;
   }
while(!read_bit(FILTER_HOME))           /* wait for filter wheel slot*/
   {
   set_bit(FILTER_STEP);                /* pulse filter motor high */
   for (j=1; j<=b_period; j++)
      ;
   clear_bit(FILTER_STEP);              /* pulse motor low */
   for (j=1; j<=b_period; j++)
      ;
   }
}
/* ------------------------------------------------- */
void home_filter_wheel()                /* moves the filter wheel to home position */
{                                       /* home is denoted by double position slots */
int f_cnt;                              /* near one another */
b_period = F_PERIOD;
over:
f_cnt = 0;
while(!read_bit(FILTER_HOME))           /* wait for filter wheel sensor to find a slot*/
   {
   set_bit(FILTER_STEP);                /* pulse filter motor high */
   for (j=1; j<=b_period; j++)
      ;
   clear_bit(FILTER_STEP);              /* pulse motor low */
   for (j=1; j<=b_period; j++)
      ;
   }
while(read_bit(FILTER_HOME))            /* wait for filter wheel slot to clear sensor*/
   {
   set_bit(FILTER_STEP);                /* pulse filter motor high */
   for (j=1; j<=b_period; j++)
      ;
   clear_bit_bit(FILTER_STEP);          /* pulse motor low */
   for (j=1; j<=b_period; j++)
      ;
   }
while(!read_bit(FILTER_HOME))           /* wait for filter wheel home slot*/
   {
   set_bit(FILTER_STEP);                /* pulse filter motor high */
```

APPENDIX A

```c
    for (j=1; j<=b_period; j++)
        ;
    clear_bit(FILTER_STEP);          /* pulse motor low */
    for (j=1; j<=b_period; j++)
        ;
    ++f_cnt                          /* count # of filter motor steps */
    }
if (f_cnt > F_HOME)                  /* compare # motor steps to known value */
    goto over;                       /* this was not the double slot */
}
/* ---------------------------------------------------------------- */
int select(oper)                     /* used to gain additional outputs */
int oper;
{
write_XDATA(oper,0xFF);              /* Write dummy data */
return(oper);                        /* returned parameter not used */
}
/* ---------------------------------------------------------------- */
void get_shutter_times()             /* Check setting of shutter time switches */
{
select (0x5E00);                     /* select red thumbwheel switch */
r_time = 1 * read_bit(SHUT_0);       /* read thumbwheel switch setting */
r_time = r_time + 2 * read_bit(SHUT_1);
r_time = r_time + 4 * read_bit(SHUT_2);
r_time = r_time + 8 * read_bit(SHUT_3);
r_time = r_time + 16 * read_bit(SHUT_4);
r_time = r_time + 32 * read_bit(SHUT_5);
r_time = r_time + 64 * read_bit(SHUT_6);
r_time = r_time + 128 * read_bit(SHUT_7);
select(0x5D00);                      /* select green thumbwheel switch */
g_time = 1 * read_bit(SHUT_0);       /* read thumbwheel switch setting */
g_time = g_time + 2 * read_bit(SHUT_1);
g_time = g_time + 4 * read_bit(SHUT_2);
g_time = g_time + 8 * read_bit(SHUT_3);
g_time = g_time + 16 * read_bit(SHUT_4);
g_time = g_time + 32 * read_bit(SHUT_5);
g_time = g_time + 64 * read_bit(SHUT_6);
g_time = g_time + 128 * read_bit(SHUT_7);
select(0x5B00);                      /* select blue thumbwheel switch */
b_time = 1 * read_bit(SHUT_0);       /* read thumbwheel switch setting */
b_time = b_time + 2 * read_bit(SHUT_1);
b_time = b_time + 4 * read_bit(SHUT_2);
b_time = b_time + 8 * read_bit(SHUT_3);
b_time = b_time + 16 * read_bit(SHUT_4);
b_time = b_time + 32 * read_bit(SHUT_5);
b_time = b_time + 64 * read_bit(SHUT_6);
b_time = b_time + 128 * read_bit(SHUT_7);
select(0x5F00);                      /* don't select any color */
}
/* ---------------------------------------------------------------- */
int open_shutter(sh_time,se_time)    /* open shutter for amount of time passed */
                                     /* synchronize this with the rising edge AC sync */
int sh_time,se_time;                 /* time from thumbwheel switch, no units */
{
k = 130 + (26 * sh_time);            /* scale shutter time variable for proper length*/
l = 144 + (26 * se_time);            /* set sensor variable slightly longer */
if (read_bit(AC_SYNC))               /* if in the high half of the period */
    {
    while (read_bit(AC_SYNC))        /* wait for the low half of the period to occur */
        ;
    }
while (!read_bit(AC_SYNC))           /* wait for the high half of the period */
    ;
clear_bit(SENSOR_TIMING);            /* generate pulse for sensor board */
set_bit(SHUTTER);                    /* open shutter */
for (j=1; j<=l; j++)
    {
    if (j == k)
        clear_bit(SHUTTER);          /* when time is up close shutter */
    }
set_bit(SENSOR_TIMING);              /* keep sensor signal valid until here */
return(se_time);                     /* returned parameter not used */
}
/* ---------------------------------------------------------------- */
void main()                          /* Main section of program */
{
initialize;
start:
while(read_bit(CAPTURE))             /* wait for the capture button to be pressed */
    ;
```

APPENDIX A -continued

```
home__filter__wheel();              /* home filter wheel */
get__shutter__time();               /* read rgb shutter times */
open__shutter(r__time,b__time);     /* grab red*/
advance__filter();
open__shutter(g__time,b__time);     /* grab green*/
advance__filter();
open__shutter(b__time,b__time);     /* grab blue*/
goto start;
}
/*  ......................... END ......................... */
```

We claim:

1. An imaging system comprising in combination:
   an illumination source adapted for connection to an AC power source;
   an original image positioned for illumination by said illumination source;
   a filter wheel having a plurality of color filters mounted thereon;
   an image sensor positioned to receive an image beam formed by the illumination of the original image;
   means interposed in said formed image beam between the original image and said image sensor for synchronizing the beginning of a sensor exposure period to the received image beam as a function of the phase of the AC power source and the ending of the sensor exposure period to the ending of an exposure time period; and
   means for generating different exposure time periods for each of the plurality of color filters in said filter wheel.

2. The scanner according to claim 1 and further comprising:
   threshold detector means connected to the AC power source for providing a threshold signal to said interposed means, to control the beginning of the sensor exposure period.

3. An apparatus for converting fixed images into electrically storable images, said apparatus comprising:
   means including an alternating voltage power source for providing illumination to a fixed image which illumination flickers as a function of the alternating voltage of the power source;
   means for forming an image beam from said illuminated fixed image;
   at least one array of photosensitive elements positioned to be exposed to said formed image beam;
   means for interrupting the exposure of said array of photosensitive elements to said formed image beam;
   a filter wheel having a plurality of color filters mounted thereon for cyclicaly positioning each one of the plurality of color filters into said formed image beam; and
   means for controlling the ending of the interruption of the formed image beam by said interrupting means as a function of the alternating voltage of the power source for a desired period of time.

4. The apparatus according to claim 3 and further comprising:
   threshold detector means connected to the power source for providing a threshold signal to said means for controlling the ending of the interruption of said at least one array of photosensitive elements to the formed image beam.

5. A color sequential scanner incorporating a synchronized variable exposure shutter comprising:
   an illumination source comprised of at least one fluorescent lamp and powered by an AC source for illuminating a color image to form a color image beam;
   a color filter means positioned for sequentially inserting red, green, and blue color filters in the formed color image beam;
   a shutter means positioned to control passing of the color image beam through the color filters in said color filter means;
   an image sensor means for converting the color image beam passed through the color filters into electrical signals;
   a storage means for receiving and storing the electrical signals from said image sensor means;
   a threshold detector means connected to said AC source for providing a synchronizing signal when the magnitude of a voltage from the AC source is above a threshold value;
   means connected to said shutter means for controlling the passing of said image beam using the provided synchronizing signal; and
   means for establishing three different exposure time periods for the red, green, and blue filters whereby the amount of time that the shutter means passes the color image beam to said image sensor means through the red, green and blue filters provides proper white balance.

* * * * *